United States Patent
Widess

[11] 3,735,337
[45] May 22, 1973

[54] MINIMIZING MULTIPLE REFLECTING

[75] Inventor: Moses B. Widess, Houston, Tex.

[73] Assignee: Amco Production Company, Tulsa, Okla.

[22] Filed: July 22, 1971

[21] Appl. No.: 165,258

[52] U.S. Cl. .......................................... 340/15.5 TD
[51] Int. Cl. .............................................. G01r 1/28
[58] Field of Search ................ 340/15.5 TD, 15.5 CP

[56] References Cited

UNITED STATES PATENTS

| | | | |
|---|---|---|---|
| 3,571,788 | 3/1971 | Backus et al. | 340/15.5 TD |
| 3,328,754 | 6/1967 | Woods et al. | 340/15.5 TD |
| 3,275,979 | 9/1966 | McAlpin | 340/15.5 TD |

Primary Examiner—Benjamin A. Borchelt
Assistant Examiner—G. E. Montone
Attorney—Paul F. Hawley

[57] ABSTRACT

Seismic traces obtained using the common depth point technique are time-corrected first to remove normal moveout corresponding to primary reflections, then further time-corrected to increase the variation of time at which multiple reflections occur on the various traces. The traces are then summed, which decreases the amplitude of multiple reflections relative to those of the primary reflections. Preferably before the second time correction, selection is made of traces such that there is approximately a linear residual normal moveout of multiple reflections on the traces selected. The second time correction does not seriously affect the primary reflections either in amplitude or arrival time. After the second time correction, the selected traces are summed for visual presentation.

7 Claims, 8 Drawing Figures

MINIMIZING MULTIPLE REFLECTING

BACKGROUND OF THE INVENTION

The basic seismic prospecting methods, known for many years, were improved by the technique described in U.S. Pat. No. 2,732,906 Mayne. Essentially, Mayne taught that the various traces resulting from actuation of seismic sources and pickup of seismic waves at a plurality of geophone groups on seismic spreads, could be manipulated to discriminate against random noise by time-correcting the traces in terms of record time and spread displacement which resulted in removing the normal moveout from a plurality of traces having common depth points on reflecting beds, then summing or stacking these traces to produce a single trace. Normal moveout describes the time difference occurring in reception of reflections as the distance along the surface from the source to the geophone group increases. The various techniques well known for making this correction produce traces from the various geophone groups having various source-to-geophone group spacing but a common midpoint between source and geophone group, with the travel time so corrected along the trace that the primary reflections occur on the various traces at the same instant. The corrected traces appear as if each source and its respective geophone group were located at the same surface point.

The normal moveout equation is commonly approximated by the equation $NMO = X^2/2T_oV_a^2$. In this equation $NMO$ = normal moveout
$X$ = source to geophone group distance
$T_o$ = twice the normal-incidence travel time from source to reflecting interface
$V_a$ = average seismic velocity to reflecting interface.

This equation literally applies to horizontal reflecting beds and a horizontal spread with source at the same elevation as the geophone groups, but is approximated in the case of beds of low dip, and the like.

After the normal moveout is removed, the traces are then summed, i.e., he instantaneous amplitude at each increment of time at each time-corrected trace is added to the corresponding amplitude at the identical corrected travel time for all traces with the same midpoint between source and seismometer group. Events simultaneously occurring on all time-corrected traces are then emphasized with respect to other events occurring at different times. Thus, the primary reflections (defined at those waves traveling once to a reflecting interface and once back to the geophone group) are presented at higher ratios of signal-to-noise compared with random seismic energy occurring on the various traces summed.

It is also known that to some degree, multiple reflection amplitudes are decreased by the use of the common depth point technique. Multiple reflections are those which reverberate, that is, move in a zigzag path between source and geophone group. For example, one type of such multiple reflection follows a path down to a reflecting bed, back to the surface, back to the same or a different reflecting bed, and back to the surface where the geophone group is located. If the travel time for such a multiple reflection is essentially the same as the travel time of a primary reflection reflected from a deeper bed, there should be interference on the trace, and a number of disadvantageous results occur. If the type of multiple reflection discussed is from beds roughly half the depth of a primary reflection of the same travel time, one may interpret a seismic cross section as having a reflecting bed at a certain depth which is in fact the result of multiple reflections from beds at about half that depth.

In the case of the Mayne technique, the attenuation of the amplitude of a multiple reflection over that of a primary reflection of equal received intensity, is due to the fact that this multiple reflection usually has greater normal moveout, since the multiple reflection results from a path through upper beds usually at a speed less than that of the primary reflection having the same total travel time. Consequently, when the normal moveout has been removed, there will be a residual normal moveout for the multiple reflection. Stacking of the various traces which at this state are somewhat out of phase attenuates the resultant signal. However, this sort of arrangement may not provide sufficient attenuation of multiple reflections.

DESCRIPTION OF THE PRIOR ART

A survey of recent seismic literature, primarily patents, indicates that only a few people have disclosed improvements on the Mayne system or on minimization of multiple reflections. Sirks in his U.S. Pat. No. 3,136,974 proposes minimizing multiple reflections (which he calls echo effects) by generating what he calls auxiliary signals which are combined with the original seismic traces at specified amplitudes and with suitable phase shifting, with the hope that this procedure will suppress the echo effects. This is a considerably more complicated arrangement than that which I employ. Also, generally it is found difficult to generate signals which will definitely decrease possible multiple reflections without having an answer to the problem before starting, that is, knowing which signals received on each seismic trace are, in fact, the multiple reflections. Also, as discussed by Mr. Sirks, the procedure is chiefly limited to one time delay corresponding to one multiple only; hence, to some degree, lacks flexibility in the ordinary circumstance when a number of multiple reflections are present on the traces.

A generally similar method of removing multiple reflections from received traces is taught by R. J. Watson in his U.S. Pat. No. 3,131,375. His details are quite different, but he also generates an auxiliary signal (in his case by a convolution process), then subtracts the auxiliary signal from the original trace to produce a seismogram free of multiples. This again being a subtraction process has the same difficulties as discussed above. It does, however, show a method in which the author contemplates that the auxiliary signal will be subtracted from the trace throughout its total record time.

J. P. Woods and E. D. Riggs in U.S. Pat. No. 3,533,047 teach an improvement on the common depth point method of Mayne in that the initial portions of the traces after correction for normal moveout are suppressed prior to the summing step for a time duration which progressively increases as the source-to-detector spacing for the traces increases. This technique removes from the summed or stacked resultant trace seismic waves which have been considerably distorted because the moveout was excessive due to the spacing between source and geophone group being comparable to the depth to the reflecting layer. However, this does not attenuate multiple reflections efficiently. These authors do state that Mayne's method has the advantage of attenuating multiple reflections, but their improvement is not directed to this problem.

SUMMARY OF THE INVENTION

The various traces obtained with different source-to-detector spacing in the common depth point seismic prospecting system are first time corrected to remove the primary reflection normal moveout on these traces. The preferred, but not completely necessary, next step is to select from such corrected traces those in which the residual normal moveout due to a particular type of multiple reflection varies essentially linearly from trace to trace. A second time correction is then made on these traces which, preferably, is on a half-positive, half-negative basis so that the average value of this time correction over all traces used is zero. This secondary time correction increases linearly with trace position away from the center of the effective spread (defined below). The amount of the secondary timing correction plus the residual normal moveout is sufficient so that upon summing the selected traces there is a considerable attenuation of the particular type of multiple reflection being considered. There is a relatively small reduction in the amplitude of any primary reflection, but essentially no change in the arrival time of this primary reflection on the summed (or stacked) resultant trace. All such traces are then made into visual presentations, such as the well-known seismic cross section.

Such a procedure can give marked discrimination against multiple reflections of the types considered particularly objectionable without the need to generate from the original traces one or more auxiliary signals, nor is it necessary to use the subtractive techniques taught in the prior art, in order to accomplish the desired attenuation of multiple reflections.

BRIEF DESCRIPTION OF THE DRAWINGS

This invention is illustrated by the following drawings which form a part of the specification and are to be read in conjunction therewith. In these figures.

DESCRIPTION OF THE PREFERRED EMBODIMENT

Figure 1:
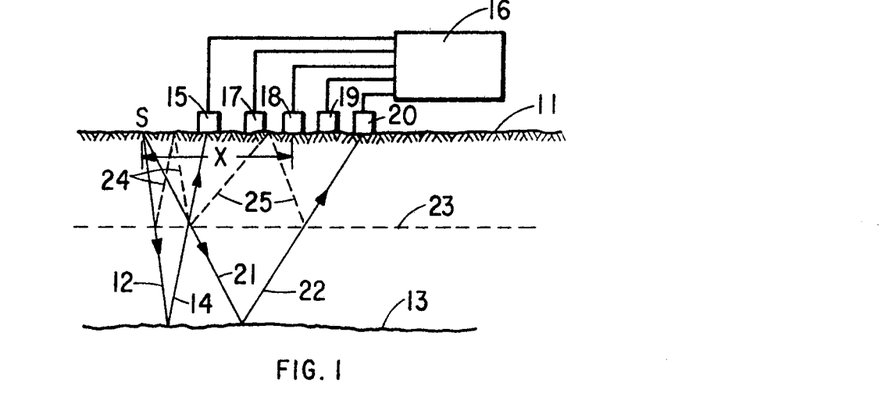
FIG. 1 shows a diagrammatic representation of certain reflection wave paths between a source of seismic waves and a plurality of geophone groups feeding a multichannel recorder.

In reflection seismic prospecting, a seismic source S shown in FIG. 1 is located at or near the surface of the earth 11, perhaps at the base of the weathered layer, to produce a set of seismic waves which move out from the source throughout the subsurface. It may be an explosive or vibrating type of source. For simplicity, only a few of the ray paths describing travel of such seismic waves are shown in the diagrammatic cross section of FIG. 1. One such wave passes down from the source S along path 12 until it encounters a change in the subsurface lithology, as at interface 13, where either the elastic characteristics or the density constant (or both) of the rocks change, causing part of the seismic wave along path 12 to be reflected along path 14 to a geophone 15 (most usually a cluster of geophones or geophone group connected together) which is connected to one channel of a multichannel amplifying and recording apparatus 16. Other geophone groups, such as groups 17–20, are located along the spread at spacings of the order of 100 to 400 feet, and each group is separately connected to a different channel of apparatus 16. The ray paths for the primary reflection from interface 13 to the geophone group 20, namely paths 21 and 22, are the only other paths shown, but such paths exist for each reflection to each geophone group. Due to the spacing between source and geophone groups (shown as X in this diagram), there is a systematic, relatively small, delay in time between the arrival of the reflected wave at group 17, and so on, to group 20 compared to that arriving at group 15. This time increment is referred to as the normal moveout, and was described earlier by its approximate equation. Since this moveout varies inversely with approximately the square of seismic velocity, if the average speed $V_a$ is quite high, there is only a very small moveout between the reflection arrival at groups 15 and 20.

It is well known that the higher amplitude multiple reflections are those in which at least one of the reflections is from the surface of the earth. Such a multiple reflection at geophone group 15 could be along a path to an intermediate reflecting horizon 23, back to the surface between the source S and group 15, re-reflected from interface 23, and up to group 15. Such a wave would follow the ray paths 24, shown by dashed lines. The same type of multiple reflection received at group 20 would pass along substantially the first section of path 21, then along dashed line paths 25, and ultimately along substantially the last section of path 22. Since this multiple reflection, in spite of its folded geometry, follows somewhat the same type of paths as those for the singly reflected waves (hereafter called primary reflections), it is readily seen that the multiple reflections will also have normal moveout, i.e., such waves will arrive at the geophone group nearest the source a short time before their arrival at the farthest geophone group.

Again it can be seen by reference to FIG. 1 that if the average velocity $V_a$ of the seismic waves to interface 13 were the same at all depths, the moveout for both the primary reflection and the multiple reflection from an interface 23, half the depth of interface 13, would be exactly the same. Such a curve of normal moveout versus spacing X is shown as Curve A in FIG. 3. It is approximately parabolical in shape.

It is usually found in seismic prospecting that the velocity of compressional waves through the earth's sedimentary section increases considerably as the depth increases. Accordingly, if a multiple reflection and a primary reflection were to arrive at geophone group 15 in FIG. 1 essentially simultaneously, the multiple reflection would be from an interface less than half the depth to the interface for the primary reflection, and (since $V_a$ would average less for the shallower paths traversed) its moveout would be greater than that of the primary reflection. The moveout of such a multiple reflection is plotted as Curve B in FIG. 3. The difference between the normal moveout for the primary reflection (Curve A) and that for a multiple reflection (of which Curve B is one example) is called the residual normal moveout, or RNMO.

It is noteworthy that since multiple reflections of necessity must always arrive over paths traversing shallower beds than the corresponding primary reflection of equal travel time, the normal moveout of a multiple reflection will usually exceed the normal moveout of the primary reflection arriving at the same time.

Figure 2:
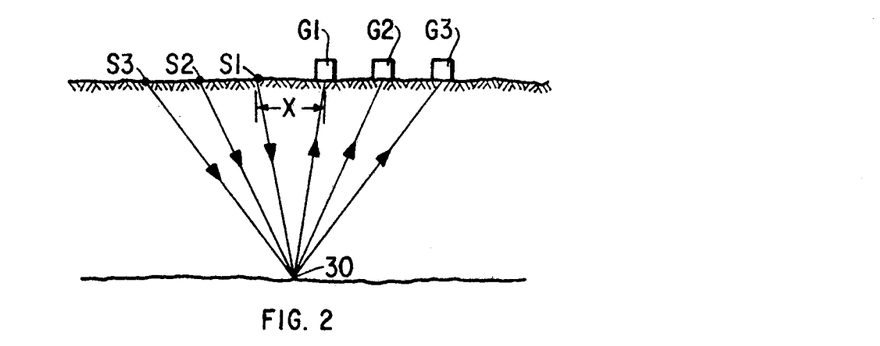
FIG. 2 is a diagrammatic representation of certain reflection wave paths involved in common depth point prospecting in accordance with the Mayne patent mentioned above.

In FIG. 2 there is shown diagrammatically a simplified version of the common depth point technique described in Mayne's U.S. Pat. No. 2,732,906. A plurality of sources is employed, one after another, and a plurality of corresponding geophone groups is employed such that any possible reflection point 30 for one source-to-geophone group spacing, such as $S_1$–$G_1$ will be the same as that for any other source-to-geophone group spacing, such as $S_2$–$G_2$, or $S_3$–$G_3$. In other words, one uses a plurality of points for producing seismic waves and a corresponding plurality of receiving locations chosen to lie substantially symmetrically about the midposition between any source and its receiver.

The trace corresponding to $S_1$–$G_1$ is time-corrected to remove the normal moveout. By this is meant that after the trace of amplitude versus time has been recorded, for example on one channel of a reproducing recorder such as apparatus 16, the amplitude is transposed along the time axis by an amount equal to the normal moveout for primary reflections, as given by the equation above. There are many methods known to do this either using well-known equipment to produce time changes in a recording, or, as frequently occurs at the present, use of an analog-to-digital converter and a specially programmed general-purpose computer. The same technique is then used with all other traces from such common depth point spacings to remove the effect of the spread X by the NMO time correction. The correction will, of course, be greater for $S_2$–$G_2$ than for $S_1$–$G_1$, and still correspondingly greater for $S_3$–$G_3$, and so on.

If one were using the Mayne technique only, all of these time-corrected traces would now be summed or stacked, which simply means that a single trace would be made, the amplitude of which at any one instant would be the algebraic sum of the amplitudes on all of the time-corrected traces from which the normal moveout has been removed.

Figure 3:
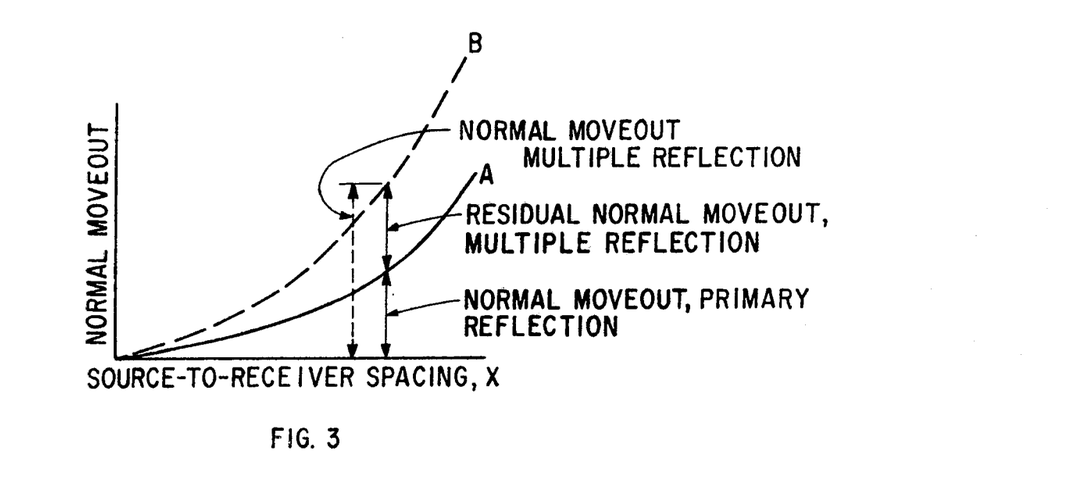
FIG. 3 is a chart of normal moveout of seismic traces versus spacing from source to receiver group.

As mentioned above, such summing or stacking does have an attenuation effect on the multiple reflections present. FIG. 3 shows that the removal of normal moveout from a plurality of records at any instant of time (that is, reducing the amplitude of Curve A to zero) would still mean that the residual normal moveout for a multiple reflection occurring at that instant would be present. When the summation was made of a plurality of time-corrected traces having different values of source-to-receiver spacing X was made, the pulses due to the multiple reflection would be out of time coincidence (out of phase) and the resultant amplitude would therefore be less than the arithmetic sum of the individual amplitudes.

Figure 6:
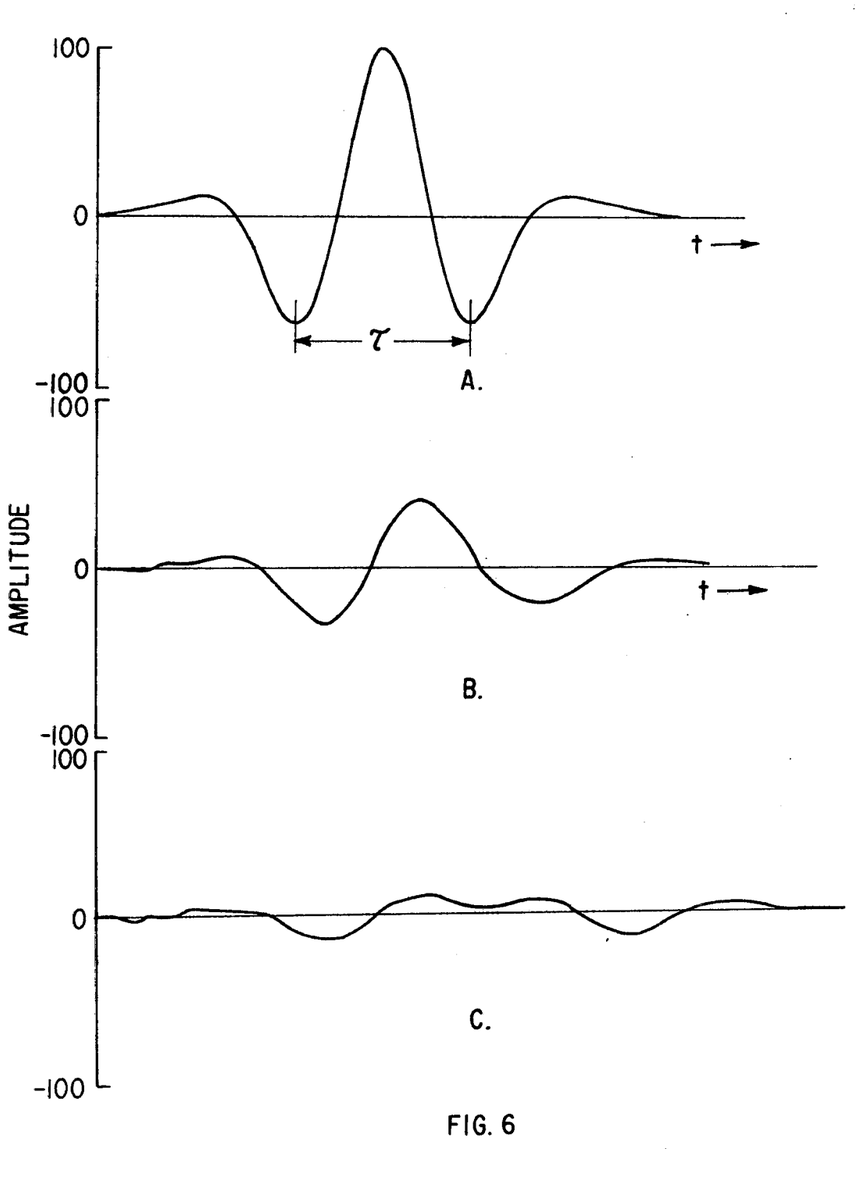
FIG. 6 shows a particular wavelet frequently encountered in seismic prospecting, the same wavelet summed up in accordance with the Mayne technique, and the summed-up wavelet when using the method of this invention.

This is shown in a theoretical example in FIG. 6. Trace A shows a typical representative wavelet, the shape of which is very frequently found in seismic prospecting. For mathematical ease, such trace is given by the so-called fourth-derivative Ricker wavelet, that is, the fourth-derivative of the error function. It is plotted in terms of time as abscissa. The breadth of the wavelet refers to the time between the two deep troughs, and is shown in Curve A as $\tau$. Curve B shows to the same time and amplitude scales the amplitude of 12 time-corrected traces containing a multiple reflection which had an amplitude on each trace of one-twelfth that of Curve A, and a residual normal moveout between the trace with minimum X and that with maximum X of approximately 70 percent of $\tau$. For example, if $\tau$ were 36 milliseconds, the residual normal moveout RNMO between first and last trace is in this example assumed to be 25 milliseconds. The trace amplitude of the stacked trace shown is directly comparable to the amplitude in Curve A. In other words, Curve A is accurately the representation of stacking 12 traces of a primary reflection (after removal of NMO from each trace), and Curve B is the result of stacking 12 traces of exactly the same pulse heights due to a multiple reflection of equal normal-incidence travel time but with a residual normal moveout RNMO between first and last traces of 0.70 $\tau$. Mathematical computation shows that the maximum peak height on Curve B is 6.8 db lower than that of Curve A, or a reduction in amplitude of slightly over 2:1.

While an attenuation in multiple reflections of the order of 6 db is certainly desirable, it is much less than the attenuation which can be achieved with my invention. This becomes evident from a consideration of FIG. 4. Curve A of this figure is a plot of the residual normal moveout in milliseconds, plotted against the effective trace distance from source-to-receiver group. In other words, time-corrected trace 2 (there is no trace 1 in this example) has 0.6 milliseconds residual normal moveout for the particular multiple reflection while trace 13 has a RNMO of 25.6 milliseconds. Instead of summing or stacking these traces, the results of which were shown in Curve B in FIG. 6, I prefer to select from these traces those having a multiple reflection residual moveout which varies approximately linearly with the trace distance. By reference to the dashed Curve B of FIG. 4, it is seen that traces 7 to 13 very closely satisfy this criterion and that if one substitutes trace 5 for trace 6, and trace 2 for trace 5, that this criterion is met by two additional traces. This transposition of traces really involves nothing more than renumbering these traces, and omitting from further consideration original traces 3, 4, and 6. After transposition of these two traces, the traces are considered to lie at positions I call the effective trace distances or effective trace positions. We now have effective trace distances from 5 to 13. (The trace selection step is not always necessary, as will be described below.)

In the following description I shall use the term "effective time difference." One such effective time difference is $\Delta T_m$, which is defined as n multiplied by the slope of Curve B in FIG. 4, where n is the number of traces used after rejecting traces as described above. Accordingly, in this example, $\Delta T_m$ is very close to the product of (1) 25 milliseconds, the RNMO between the first and last traces that are used, and (2) the quantity nine-eighths, since $n$ is 9 in this example. Therefore, $\Delta T_m$ is 28.1 milliseconds.

The next step consists in making a further or second timing correction to each of the selected traces, in this case traces 5 to 13. Here one criterion is that the average value of the second timing correction is zero, that is, if one sums up the timing correction algebraically for all of the traces being employed, the sum is essentially zero. The amount of timing correction applied to each trace varies linearly with the effective trace distance from the center of these traces. The sense of both criteria is that the middle trace has zero time correction, the traces for lower effective trace distances have negative linearly increasing timing corrections, while those for higher effective trace distances have positive linearly increasing timing corrections. Curve C shows the plot of time differences in terms of effective trace distance.

Figure 4:
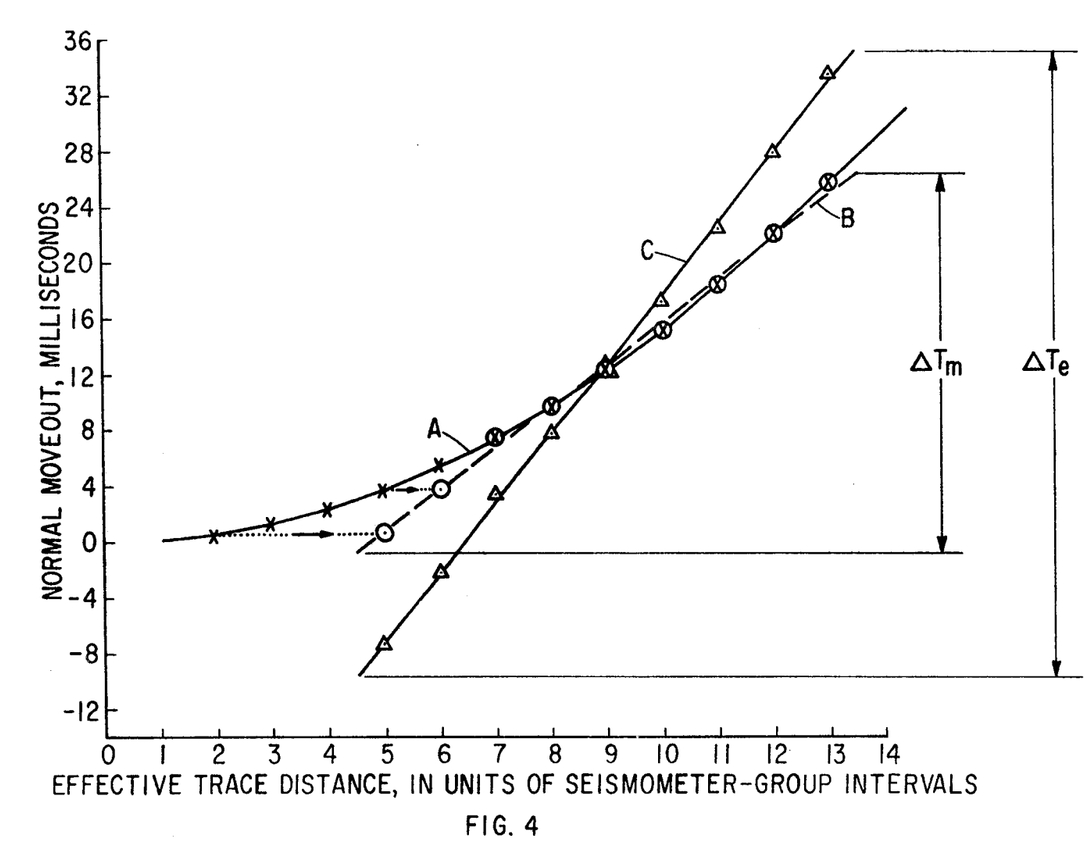
FIG. 4 is a time versus spacing chart illustrating time corrections made on the traces.

The effective total time difference in the selected traces used is shown in FIG. 4 as $\Delta$ Te. (Analogous to $\Delta$ Tm, $\Delta$ Te is defined as $n$ multiplied by the slope of Curve C, where $n$ is 9 in this example.) This time is chosen so that upon summation or stacking of the traces, at least one type of multiple reflection is attenuated very effectively on the resultant summation trace. While the attenuation obtained is to some degree dependent upon the shape of the multiple reflection trace, it is found in practice that enough of such multiple reflections have a shape about like that shown in Curve A of FIG. 6 so that the conclusions which can be drawn from treatment of this shape have general application.

Figure 5:
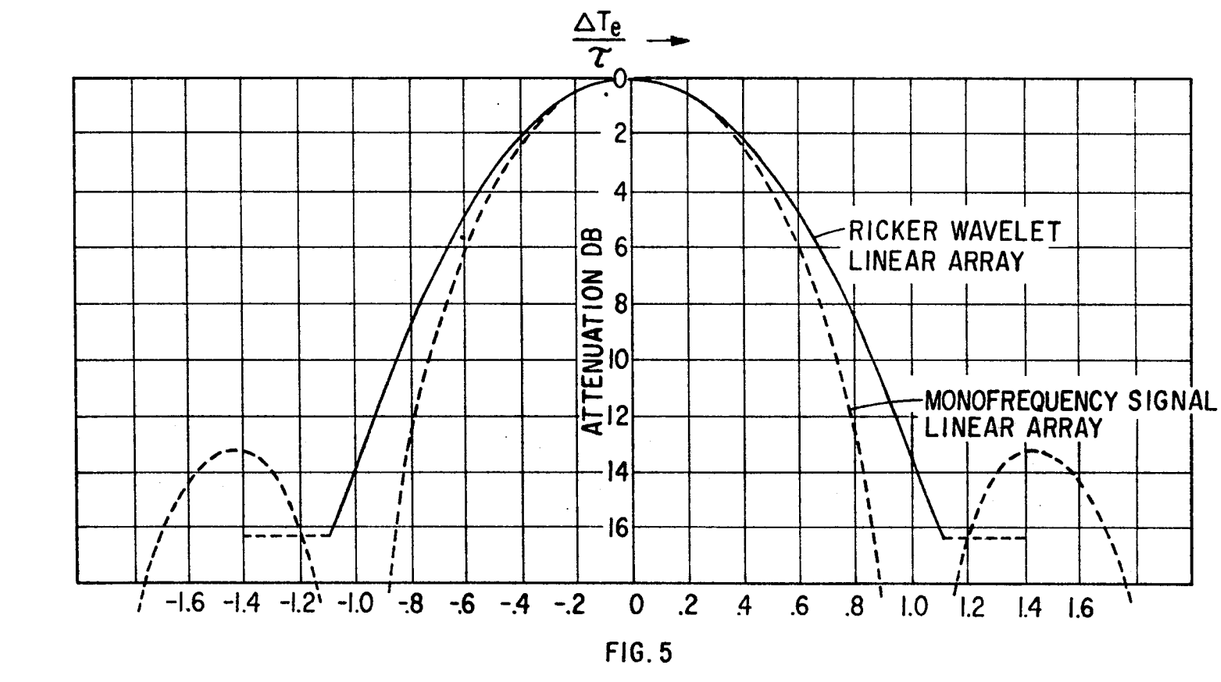
FIG. 5 shows the relative attenuation of seismic waves from reflections on summed traces when certain time shifts are produced in accordance with this invention.

A mathematical treatment of the attenuation resulting from summing a plurality of wavelets of the form of Curve A of FIg. 6 is shown by the chart of FIG. 5. The ordinate of this chart is the attenuation in decibels resulting upon summing at least six seismic traces which have had uniform time difference between adjacent traces, with an effective total time difference $\Delta$ Te, plotted against $\Delta$ Te/$\tau$, where $\tau$ is the breadth of the wavelet as shown in Curve A of FIG. 6. Similar attenuation charts can be prepared for other forms of waves; for example, in this same figure is shown in dashed lines the attenuation for a sine wave signal where the summation is equal to or greater than six traces. It is seen from this figure that when $\Delta$ Te/$\tau$ is zero, i.e., when the total time shift per trace is zero, there is zero attenuation. An attenuation of 16 db, corresponding to a decrease in peak signal amplitude of 6.3:1 is found at a value of $\Delta$ Te/$\tau$ of 1.1 for the wavelet of Curve A of FIG. 6. In other words, to secure this attenuation of the multiple reflection for a wavelet having a breadth $\tau$ of 36 milliseconds requires a value of $\Delta$ Te of about 40 milliseconds. A somewhat larger value is used in FIG. 4. Making the second time correction zero on trace 9 and increasing it linearly to trace 13 where it has the maximum value of + 8 milliseconds (and similarly linearly increasing, but in a negative sense, to a maximum value on effective trace 5 of −8 milliseconds), produces the desired value of $\Delta$ Te of approximately (25 + 16)(9/8) = 46.1 milliseconds. Summation of 9 traces of the original wavelet produces the trace shown as Curve C in FIG. 6 with a resultant attenuation of 16.5 db.

It is thus apparent that multiple reflection attenuation is increased by making this second time correction prior to the ultimate summation or stacking. In this case, the total change in time introduced across these nine traces is a total of 16 milliseconds, that is, eight each side of the zero correction on trace 9. This correction has also made an attenuation of any primary reflection arriving at this time, but this is small. The value of $\Delta$ Te/$\tau$ applicable to the primary reflection in the case considered is (16)(9/8) divided by 36, which is 0.5, resulting in an attenuation of any primary occurring at this time of only 3.3 db. Accordingly, it is seen that 13.2 db additional attenuation of the multiple reflection has been obtained by using my invention, i.e., applying the second timing correction to each of the selected traces before the summation or stacking.

Theoretically a greater attenuation could have been obtained with a wavelet approaching a sine wave in shape, as shown by the dashed curve on FIG. 5, but this shape is much less frequently found on seismic traces.

It is to be understood that the second timing correction applied to each of the traces used before making the final summation has a maximum value of $\Delta$ Te− $\Delta$ Tm/2, where $\Delta$ Tm is the effective residual normal moveout of a multiple reflection over the effective group spacing (in FIG. 4, traces 5 to 13). It should be added that this correction, having an average value of zero, does not affect the travel time of a primary reflection, since when the ultimate summation is made, the resultant peak of the summed wavelets from the primary reflection is in exactly the same time position as it had occupied on the traces before the second timing correction was applied.

One can apply the same second timing correction over all the seismic traces employed for a limited duration time band, for example, for a record time of 0.4 to 0.7 seconds, or 1 to 1.5 seconds, etc. If the same amount of second timing correction is applied across the overall traces, that is from the start to the end of the record time, the attenuation against multiple reflections may be optimum at one point along the record time and less than optimum values for other record times because of variation in residual normal moveout. Accordingly, a time varying correction is desirable under these circumstances. This may be easily achieved with a computer program, and with little difficulty on any of the prior art equipment using machines to introduce time leads or lags in seismic traces, as have been previously discussed in this art.

The resultant single summation trace prepared after making the second time correction to each of the traces employed is ultimately presented visually for use by the seismic prospector. One conventional form of presentation of such traces is on a side-by-side presentation of stacked traces obtained systematically with the common reflection points progressing in the direction in which the survey is being made by substantially equal amounts. This is called a seismic section. Other forms of presentation are, of course, known in the art and can be used with this summed trace.

Figure 7:
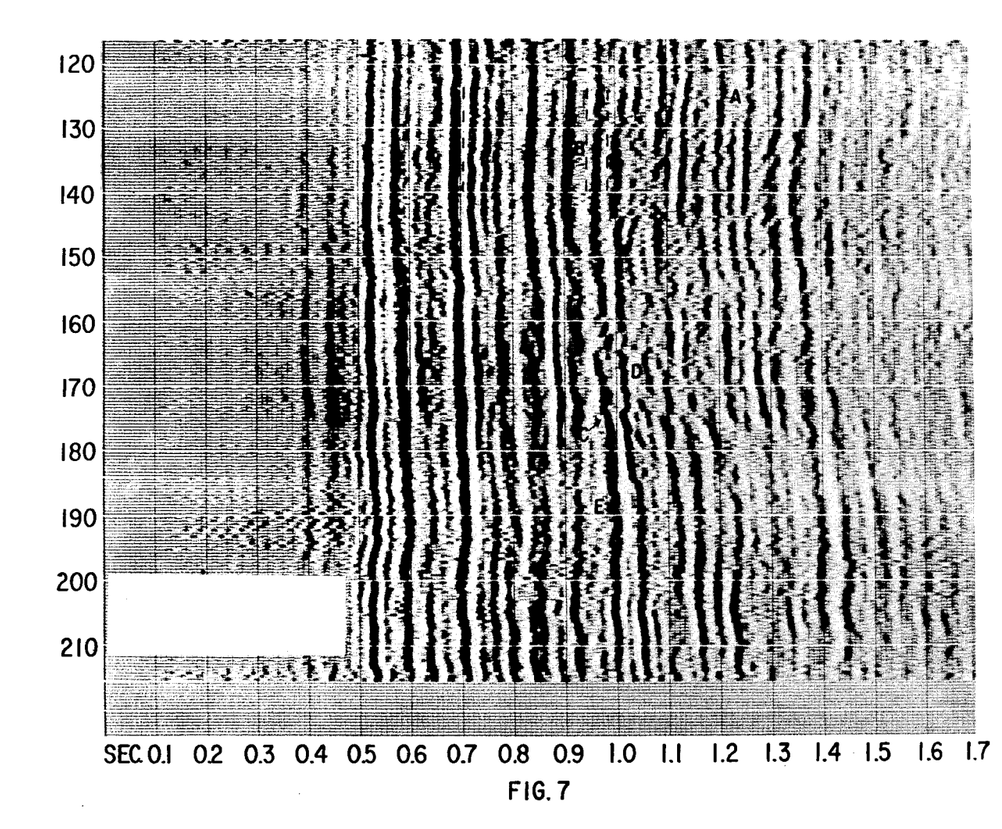
FIGS. 7 and 8 show a seismic section processed first in accordance with the Mayne technique and second, using this invention.
Figure 8:
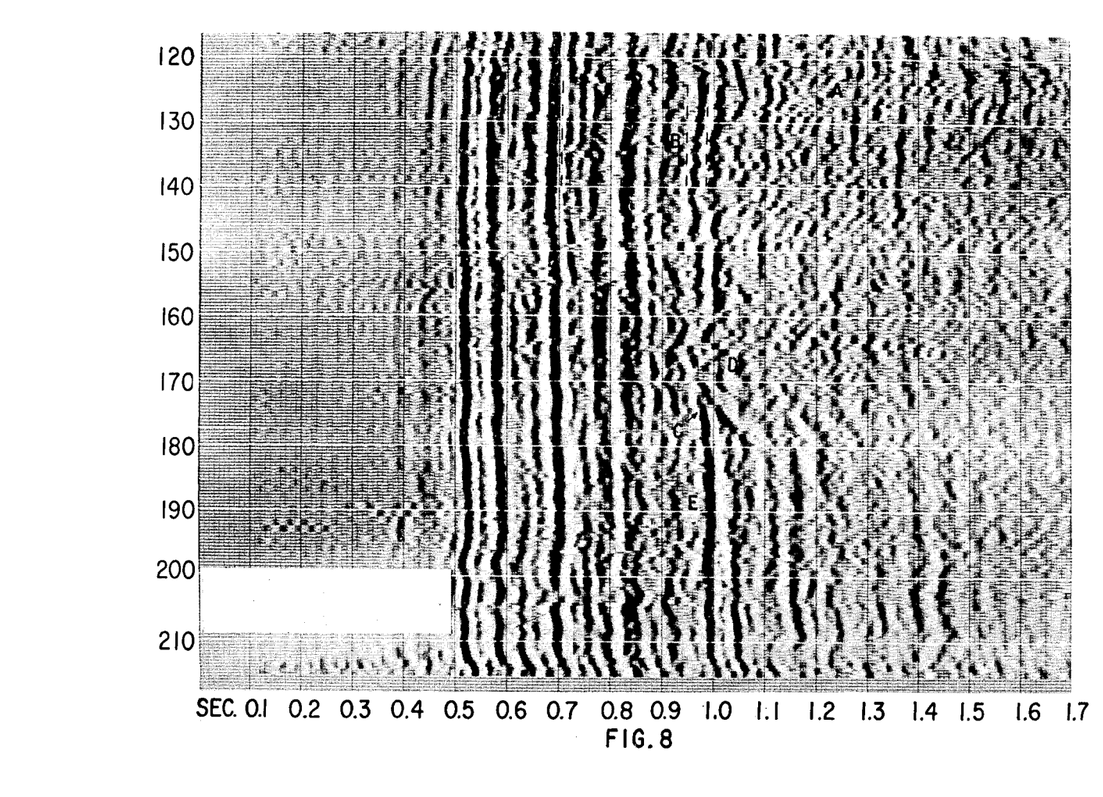

An example of benefits obtained by this relatively simple means of minimizing multiple reflections is shown in the two photographs, FIGS. 7 and 8. FIG. 7 shows a conventionally processed seismic section made in accordance with the Mayne technique. The traverse in this case was covered by 12-fold summing up at each point, using the Vibroseis technique with 24-group split spreads. The numbers from 120 to 210 across one edge of the section indicate the location of the center of the respective spreads. The numbers from 0.1 to 1.6 are the record times, that is, the time after the initiation of the seismic waves until the wave was received. FIG. 8 presents the same data in the same manner, except that in this case my invention was employed to minimize the presence of the multiple reflections, as described above. Accordingly, the two visual presentations form an effective "before" and "after" representation of the results of using my technique. It should be pointed out that it was known that the geologic basement, that is, the bottom of the sedimentary column in this region, occurred at a depth corresponding to a record time of about 1 second. Accordingly, on FIG. 7 the continuous events appearing in the vicinity of A on the conventional section are multiple reflections. They are strikingly attenuated and mutilated in the corresponding time zones of FIG. 8. On the conventional section the event occurring around 0.7 seconds is essentially parallel to that occurring about 0.98 seconds, as shown by the parallel dashed lines at B. Review of these same regions in the section of FIG. 8, which has the same set of parallel dashed lines, shows a distinct change in the isotime over this 0.28 seconds interval. It appears the conventional section is in error, with the 0.98 second reflection largely being a multiple reflection. By attenuating the multiple reflection, my technique has provided reliable evidence for the change in isotime. In the conventional section, in the region C and D, the 0.98-second horizon might be interpreted to be continuous over the full length of the section. However, the corresponding part of the section in FIG. 8 indicates this horizon is broken. At item C there is an abrupt break in the section of FIG. 8 and at D a disruption on the lower leg of the reflection, while on the conventional section of FIG. 7 both these legs are continuous. This is another evidence of interference by multiple reflections. One interprets the improved cross section of FIG. 8 that this horizon is broken, possibly by a protruding basement knob. Item E shows improved continuity of the early leg of this reflection after use of my invention.

In practice I find it desirable to obtain an attenuation of the multiple reflections of about 5 or 6 db at least, and accordingly, the corresponding value of $\Delta$ Te/$\tau$ should have a minimum value of about 0.6. However, the second time correction is useful only for values of $\Delta$ Te/$\tau$ less than about 1.2. Beyond about this value the second time correction may actually cause diminution in multiple reflection attenuation. Accordingly, for $\Delta$ Tm/$\tau$ beyond about 1.2, I use only the trace rejection portion of the method. An alternative in some cases is to make the second time correction such that $\Delta$ Te is smaller rather than larger than $\Delta$ Tm.

In many areas the prospecting would be distinctly slowed down if one obtained as many as 12 source-to-detector distances for each depth point. In practice I find that one can obtain an equivalent arrangement which is quite effective with consequent higher attenuation (approximately the values given in FIG. 5) when one stacks selected traces from two (or more) adjacent common depth points surveyed. Thus, one can stack six traces from one common depth point and six others from the next.

It is realized that variations can be made in the processing without departing from the spirit of this invention. For example, one could avoid leaving out the traces which did not exhibit approximate linear variation in residual normal moveout of the multiple reflection. Thus, for example, one could process traces like traces 3, 4, and 6 of FIG. 4 by time lags which would cause these traces after the secondary timing correction to fit on line C of FIG. 4. However, primary reflections would suffer more while the additional number of traces would add relatively little to the attenuation of multiple reflections. Note that the attenuation chart, FIG. 5, is for a linear array of six or more traces. Consequently, the changing of the number of traces to be added in the case of FIG. 4 from 9 to 12 is not worthwhile.

Another variation which also does not require rejection of traces is as follows. The signal amplitude of each trace is multiplied by a factor (which I shall call "weight," designated by W) proportional to the source-to-detector distance for that trace. The effect of such weighting is of course the same as though each trace were to be substituted by W number of simulated traces having the same amplitude as the original trace. For example, a trace at position 2 in FIG. 4 is simulated by two traces, the trace at position 3 is simulated by three traces, and so on until the trace at position 13 is simulated by 13 traces. Hypothetically placing all the simulated traces in this order and with uniform separation, one obtains new position numbers for the simulated traces. Because residual normal moveout is (approximately) proportional to the square of the source-to-detector distance, residual normal moveout of the simulated traces becomes substantially linear with the position of these traces. Thus, the weighting of the original traces (having a common depth point) has achieved the desired linearity, so that the weighted traces can be added. However, before these weighted traces are added, the second time correction is applied to the traces in the manner already described.

I claim:

1. A process for combining seismic traces representing signals reflected from at least approximately common points in a subsurface formation in which said traces have been obtained using a plurality of spacings from the seismic sources to the detectors, comprising
    1. selecting a reference trace and time-correcting the other of said traces with respect to this reference trace to remove the primary reflection normal moveout from at least a common time band of all said traces,
    2. applying a second timing correction to each of said traces the average value of which is zero and the amount of which applied to each trace is substantially linearly proportional to the effective position of the geophone group from which said trace was obtained, and
    3. thereafter adding the second time-corrected traces to provide a single summation trace in which primary reflections have been enhanced in amplitude relative to multiple reflections.

2. A process in accordance with claim 1 in which said common time band is essentially the whole record time of each of said traces, and including the step of making a visual presentation of said single summation trace.

3. A process in accordance with claim 2 including the step of selecting from said traces only those having a multiple reflection residual normal moveout which varies approximately linearly with effective trace distance prior to applying said second timing correction, and said second timing correction is zero at least near the center of the effective trace distance of the selected traces.

4. A process in accordance with claim 3 in which the absolute maximum value of said second timing correction is approximately $\Delta T_e - \Delta T_m/2$ where $\Delta T_e$ is the total effective moveout over the total effective source-to-geophone group spacing corresponding to the selected traces, $\Delta T_m$ is the effective residual normal moveout of a multiple reflection over said group spacing, and $\Delta T_e/\tau$ (where $\tau$ is the predominant period of the wavelet corresponding to said multiple reflection) has a value of at least about 0.6.

5. A process in accordance with claim 3 in which the absolute maximum value of said second timing correction is approximately $\Delta T_e - \Delta T_m/2$ where $\Delta T_e$ is the total effective moveout over the total effective source-to-geophone group spacing corresponding to the selected traces, $\Delta T_m$ is the effective residual normal moveout of a multiple reflection over said group spacing, and $\Delta T_e/\tau$ (where $\tau$ is the predominant period of the wavelet corresponding to said multiple reflection) has a value in the range of about 0.6 to about 1.2.

6. A process for seismic prospecting comprising
  1. producing seismic waves at least near the surface of the earth,
  2. receiving said seismic waves after reflection from subsurface formations and forming a reproducible trace as a function of time of the received seismic waves,
  3. repeating steps (1) and (2) for a plurality of producing and receiving locations chosen to lie substantially symmetrically about the midposition between the initial producing and receiving locations of steps (1) and (2), thereby producing a plurality of said reproducible traces,
  4. time-correcting all of said traces to remove the primary reflection normal moveout from said traces,
  5. applying a second timing correction to each of said traces the average value of which is zero and the amount of which applied to each trace is substantially linearly proportional to the distance from the midpoint of said effective receiving locations to the effective receiving location corresponding to each trace being so corrected, and
  6. producing a visual indication proportional to the summation of the second time-corrected traces to produce a trace in which multiple seismic reflections have been attenuated.

7. A process in accordance with claim 6 including the step of selecting from said traces only those having a multiple reflection residual moveout which varies approximately linearly with effective trace distance prior to applying said second timing correction, and said second timing correction is zero at the midpoint of said effective receiving locations.

* * * * *